UNITED STATES PATENT OFFICE.

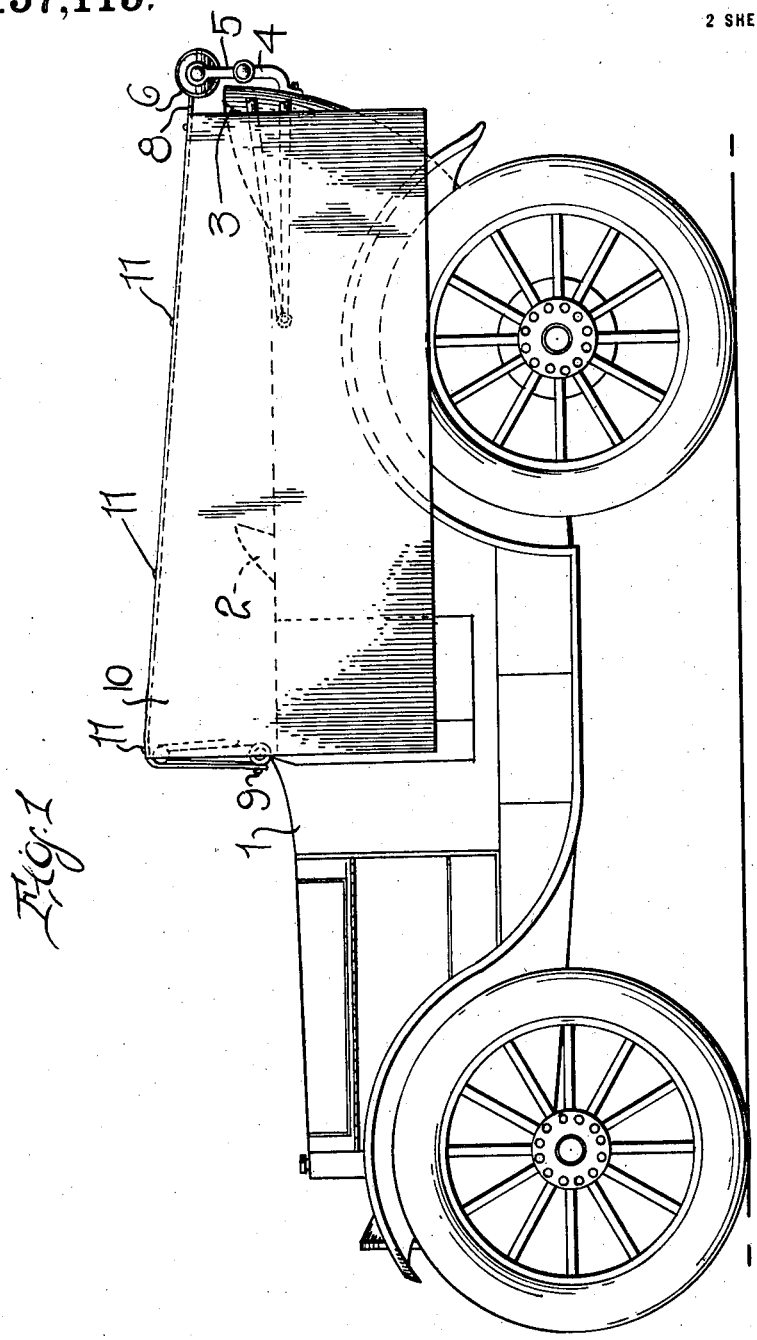

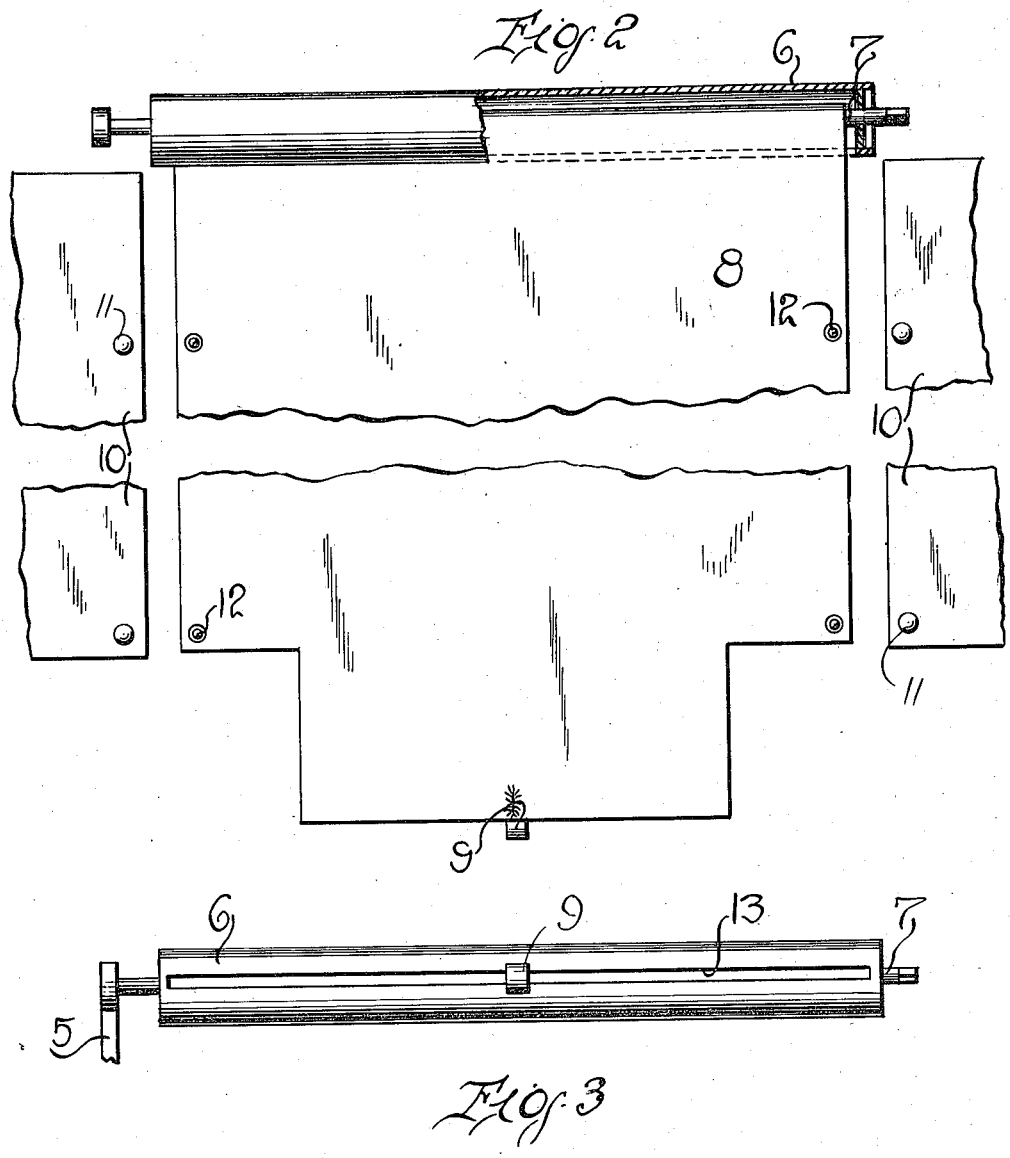

WALTER LUTHER McINTYRE, OF MEMPHIS, TENNESSEE.

AUTOMOBILE-COVER.

1,157,115. Specification of Letters Patent. Patented Oct. 19, 1915.

Application filed October 17, 1914. Serial No. 867,220.

*To all whom it may concern:*

Be it known that I, WALTER L. MCINTYRE, a citizen of the United States, residing at Memphis, in the county of Shelby and State of Tennessee, have invented certain new and useful Improvements in Automobile-Covers, of which the following is a specification, reference being had to the accompanying drawings.

This invention relates to attachments for automobiles or similar vehicles, and particularly to covers therefor.

An object of this invention is the provision of a cover for automobiles which is adapted for use to cover the seats and body of the vehicle when the vehicle top is in folded position, to protect the upholstery of the seats from the rays of the sun.

A further object of this invention is the provision of a water-proof cover for an automobile or the like, which may be quickly and easily disposed to cover the seats and body of the vehicle by one person when the automobile top is in folded position, to protect the seats and the body in the event of a sudden rain storm.

Still another object of this invention is the provision of a cover which is connected at one end edge to a roller which is carried by the body of the vehicle, so that the cover when not in use may be carried in an extremely small space and out of the way of the automobile top and supporting bows.

With these and other objects in view, my invention consists in the novel construction, combination, and arrangement of parts to be hereinafter more fully described, claimed, and illustrated in the accompanying drawing, in which—

Figure 1 is a side elevational view of my device showing the same in operative position connected to a vehicle; Fig. 2 is a top plan view partly broken away of the casing showing the curtain in extended position; and Fig. 3 is an elevational view of the casing showing the curtain inclosed therein.

Referring more particularly to the drawing, the numeral 1 designates the body of an ordinary touring automobile which is provided with a front seat 2 and a rear seat 3, and projecting upwardly from the back of the rear seat at its opposite ends are standards 4. Hingedly connected to the standards are arms 5 which carry a tubular casing 6 within which a spring actuated roller 7 is carried. The roller 7 is of substantially the same construction as the well known shade roller used in hanging window shades. Connected at one end edge to the roller 7 is a rectangular curtain 8, the curtain being of a length suitable to extend forwardly over the body of the vehicle, to the wind shield thereof, and being provided with suitable fastening device 9 by means of which the curtain may be secured to the wind shield and held in position over the body of the vehicle. Secured to the side edges of the curtain are flaps 10 which are normally disconnected from the curtain, the flaps being provided near their inner edges with buttons 11 which are adapted for engagement with the clasps 12 on the upper face of the body of the curtain whereby the side flaps may be held in place on the top of the curtain. The casing 6 is of a size suitable to inclose the curtain when not desired for use, and the casing is provided with a longitudinal slot 13 through which the curtain may be drawn when the same is desired for use.

In the practical use of my device, the arms 5 are normally folded rearwardly so as to dispose the casing 6 rearwardly of the rear seat back, with the curtain rolled upon the roller therein, and when the curtain is desired for use, the arms 5 are swung to a vertical position to dispose the casing 6 above the back of the rear seat, whereupon the curtain may be drawn through the slot in the casing against the tension of the spring actuated roller, the forward edge of the curtain being secured to the wind shield to entirely cover the body of the vehicle.

It will be understood that my improved curtain is designed for use only when the folding top of the vehicle is in folded position, and when the automobile is to be left standing in the sun, the curtain being quickly adjusted to cover the vehicle so as to protect the upholstery of the seats from the rays of the sun. When it is again desired to use the vehicle, the fastening device 9 may be released from the wind shield and the curtain rolled upon the roller by the tension of the spring in the ordinary manner.

My improved curtain may be composed of water-proof material, so that the same will be extremely effective in case of sudden showers when the machine is standing and the folding top thereof is thrown back, as the curtain may be readily disposed to cover the machine by one person, whereas the ordinary folding top requires the coöperation of two persons to place the same in effective position, and it is also necessary to secure side curtains in place to adequately protect the body of the vehicle. With my improved device, in case of a sudden shower, the waterproof curtain may be quickly drawn out of its casing and secured in the above described manner, and the side flaps 10 may be connected to the side edges of the curtain to protect the seats and the body of the vehicle from the rain.

Having thus fully described my invention, what I desire to claim and secure by Letters Patent is:—

A cover for automobiles or similar vehicles comprising spaced standards fixed to the rear of the vehicle, arms hingedly connected to the standards, a tubular casing supported between said arms, and provided with an elongated slot, a spring actuated roller arranged within said casing, a curtain normally wound upon said roller and adapted to be extended through said slot to the front of the vehicle, means for securing the outer end of the curtain when in an operative position and removable side curtains detachably connected to the first curtain when the same is in an extended position as and for the purpose set forth.

In testimony whereof I hereunto affix my signature in the presence of two witnesses.

WALTER LUTHER McINTYRE.

Witnesses:
  A. B. STUART,
  R. E. TURNER.